(12) United States Patent
Chopra et al.

(10) Patent No.: US 10,915,251 B2
(45) Date of Patent: *Feb. 9, 2021

(54) DYNAMIC PARALLELISM

(71) Applicant: EMC IP Holding Company LLC, Hopkinton, MA (US)

(72) Inventors: Shelesh Chopra, Bangalore (IN); Rajkumar Palkhade, Pune (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/511,924

(22) Filed: Jul. 15, 2019

(65) Prior Publication Data

US 2019/0391745 A1 Dec. 26, 2019

Related U.S. Application Data

(63) Continuation of application No. 16/220,973, filed on Dec. 14, 2018, now Pat. No. 10,402,103, which is a continuation of application No. 14/752,397, filed on Jun. 26, 2015, now Pat. No. 10,185,500.

(51) Int. Cl.
*G06F 3/06* (2006.01)
*G06F 11/14* (2006.01)

(52) U.S. Cl.
CPC .......... *G06F 3/0613* (2013.01); *G06F 3/065* (2013.01); *G06F 3/067* (2013.01); *G06F 3/0619* (2013.01); *G06F 11/1458* (2013.01); *G06F 11/1464* (2013.01)

(58) Field of Classification Search
None
See application file for complete search history.

(56) References Cited

U.S. PATENT DOCUMENTS

| | | |
|---|---|---|
| 6,625,750 B1 | 9/2003 | Duso |
| 7,146,387 B1 | 12/2006 | Russo |
| 8,615,492 B1 | 12/2013 | Clifford |
| 9,201,739 B1 | 12/2015 | Bagchi |
| 9,842,027 B1 | 12/2017 | Chopra |
| 2007/0283089 A1 | 12/2007 | Tsurudome |
| 2008/0126723 A1 | 5/2008 | Ashton |
| 2012/0131583 A1 | 5/2012 | Cherkasova |
| 2013/0212074 A1 | 8/2013 | Romanski |
| 2014/0033199 A1 | 1/2014 | Falodiya |

*Primary Examiner* — Charles Rones
*Assistant Examiner* — Ryan Dare
(74) *Attorney, Agent, or Firm* — Krishnendu Gupta; Peter Jovanovic (57) ABSTRACT

Techniques to optimize use of the available capacity of a backup target storage device are disclosed. In various embodiments, a current capacity of a target system to which backup data is to be streamed to handle additional streams is determined dynamically, at or near a time at which a backup operation is to be performed. One or more backup parameters of the backup operation is/are set dynamically, based at least in part on the dynamically determined current capacity of the target system.

20 Claims, 6 Drawing Sheets

DYNAMIC PARALLELISM

CROSS REFERENCE TO OTHER APPLICATIONS

This application is a continuation of co-pending U.S. patent application Ser. No. 16/220,973, entitled DYNAMIC PARALLELISM filed Dec. 14, 2018 which is incorporated herein by reference for all purposes, which is a continuation of U.S. patent application Ser. No. 14/752,397, now U.S. Pat. No. 10,185,500, entitled DYNAMIC PARALLELISM filed Jun. 26, 2015 which is incorporated herein by reference for all purposes.

BACKGROUND OF THE INVENTION

Data backup involves copying data from a source system to a backup storage media/system, sometimes referred to a backup "target". Data sets have grown to be increasingly large, and business requirements of high availability have resulted in an ever increasing need to be able to back up more and more data ever more quickly.

To increase throughput, many backup solutions support using multiple streams to send data from a source system to a backup storage node or other target system. Some types of data set, e.g., large database files such as SQL database files, may be stored on systems that support "striping" or other techniques to enable multiple portions of a stored object or other data set to be sent in parallel to a backup target system.

Backup storage systems, e.g., Data Domain® de-duplicating storage systems, support multiple concurrent connections by multiple threads. However, each model and configuration (e.g., processor type, amount of memory, etc.) may have a different number of connections that can be supported. For example, a Data Domain® model DD860 with 36 GB of memory advertises "soft" limits of 90 concurrent backup write streams, 50 concurrent backup read streams, 90 concurrent replication streams, and a "hard" limit of 149 write streams.

If a backup application attempts to perform a backup with a degree of parallelism that exceeds the capacity of the target system, one or more of the backup streams may "hang" or otherwise fail to be performed successfully. For example, if a user were to configure a backup application to back up a SQL instance that has 10 databases using a striping value of 16 stripes per database, the result would be an attempt to use 160 streams concurrently to back up the SQL instance, which would exceed both the 90 stream soft limit and the 149 stream hard limit of the Data Domain® target system mentioned above. The backup of the first nine databases might begin and proceed successfully, since they would require 9×16=144 connections, but the backup of the tenth database would hang or otherwise fail, as the hard limit on the number of write sessions the target system is able to support was exceeded.

The challenge becomes more complicated in settings in which multiple and potentially dissimilar backup applications (sometimes referred to as "data movers") are configured to use the same set of backup storage nodes (target systems), since demands placed on a target system by one data mover may not be taken into consideration by other data movers.

In the typical approach, a conservative limit may be set by an administrator on the number of concurrent streams that may be used by the backup application on the source side. For example, if the soft limit on a typical target system is understood to be 90 write streams, the administrator may set the source side limit to be 60 concurrent write streams. This approach, however, may result in unused capacity at the target system, resulting in longer backup windows than may otherwise be required, and/or could still result in limitations of the target systems being exceeded, e.g., if other data movers use the same target systems.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Using a dynamic algorithm to check the target write sessions currently available on the backup target side (e.g., Data Domain® or other storage system capable of supporting multiple concurrent write streams) and dynamically identifying the source side backup option/device settings to achieve optimal backup performance at that given instant is disclosed. In some embodiments, while a backup operation is underway the target system is checked periodically, e.g., at a configured interval, to detect whether the target system capacity has changed. If so, the backup option/device settings may be adjusted, e.g., to use more or fewer write streams concurrently depending on whether the target system has been determined to now have greater or lesser available capacity than when the current settings were determined dynamically and set.

Figure 1:
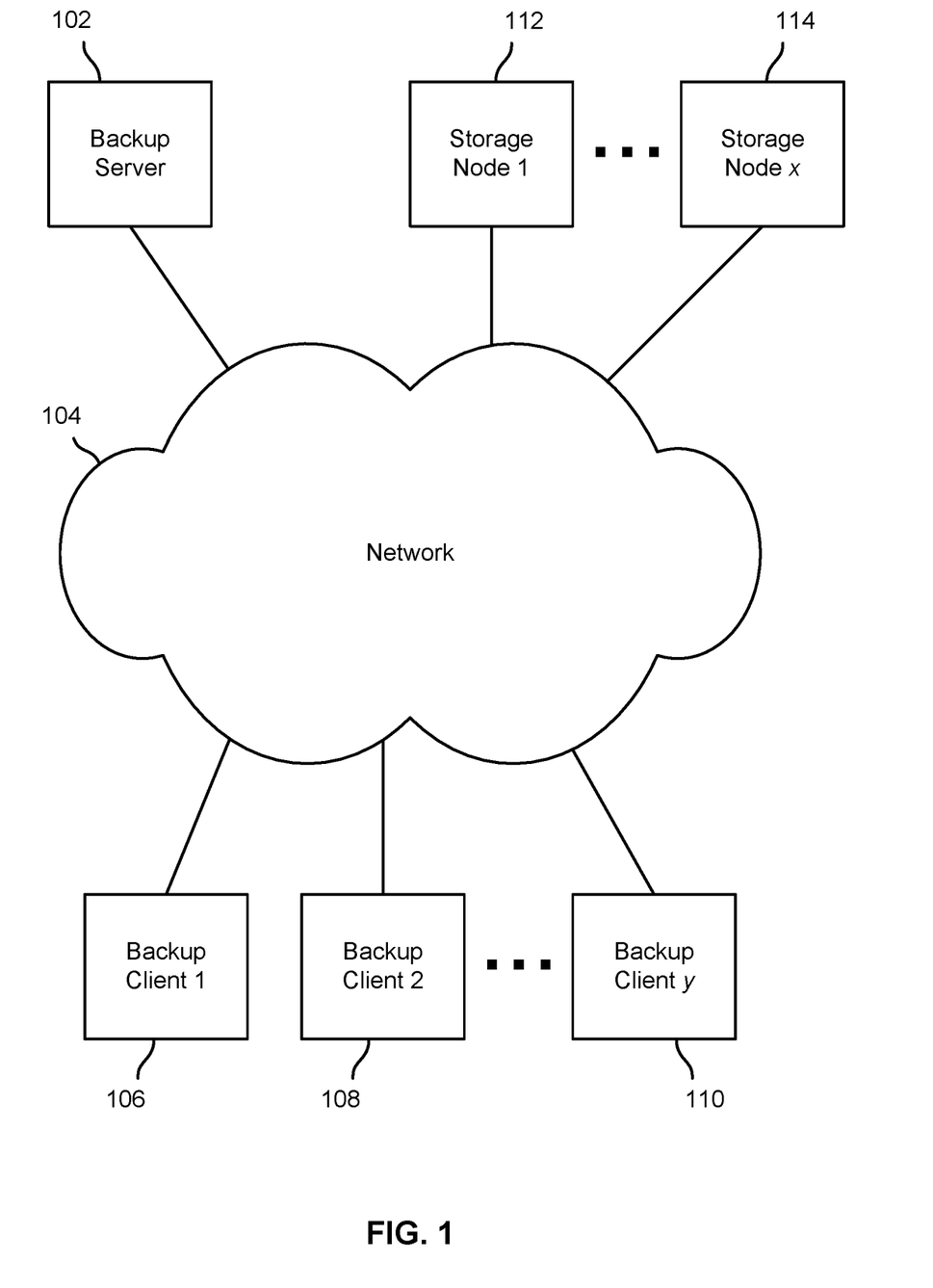
FIG. 1 is a block diagram illustrating an embodiment of a backup system and environment.

FIG. 1 is a block diagram illustrating an embodiment of a backup system and environment. In the example shown, a backup server 102 is connected via network 104 to a plurality of backup clients 1 to y, represented in FIG. 1 by backup clients 106, 108, and 110. Backup clients 106, 108, and 110 are clients with respect to backup server 102 and may be used to store data that is to be backed up under coordination by backup server 102. Examples of backup clients include, without limitation, file servers, database systems, application servers, etc. In various embodiments, backup server 102 hosts a backup application, e.g., EMC® NetWorker®. The backup server 102 may be configured to backup data stored on backup client systems, such as backup clients 106, 108, and 110. For example, an administrator may use an administrative user interface to identify backup clients 106, 108, and 110 to backup server 102, and to schedule backups to be performed by backup server 102, using backup client software (e.g., a backup client application or other software agent) running on the backup clients, to backup data from the backup client systems 106, 108, and 110 to one or more of data storage nodes 1 to x, sometimes referred to herein as backup "target" systems, represented in FIG. 1 by storage nodes 112 and 114. Examples of backup "target" systems include, without limitation, Data Domain® de-duplicating data storage systems.

In various embodiments, backup server 102 is configured to determine dynamically, at or near backup time, a then-current write stream capacity of a particular backup target system (storage node) to which data comprising the backup is to be sent. In some embodiments, a "calibrator" module of the backup server 102, and/or a calibrator system or appliance external to backup server 102, may query the target backup storage system and/or an associated knowledge base to determine the current capacity. For example, in some embodiments, the target system may be queried by calling an API of the target system to determine how many more write streams the target system currently is capable of receiving, e.g., in addition to whatever other write streams the target system may already be receiving. In some embodiments, the number of streams of each different type that the target system already has going is determined (e.g., X write streams, Y read streams, Z replication streams), and a knowledge base is consulted to determine how many more write streams the target system can handle.

In various embodiments, the backup server 102 is configured to check periodically as a backup progress to determine whether the capacity of the target system has changed since last checked, e.g., at the start of the backup. For example, if another data mover has completed a backup that involved sending data to the same target system, the target system may have further capacity available to be used. Conversely, if another data mover has started to send data to the same target system, the target system may be determined to no longer be able to support the originally allocated number of write streams, and the number being used for the current backup may need to be reduced.

In various embodiments, the number of streams to be used by the source system may be determined dynamically based at least in part on factors such as a parallelism limit of the source system (e.g., how many streams the source system can support); limitations of the network by which the backup client system (source system) is connected to the storage node (target system); the type of data set that is to be backed up (e.g., SQL database, file system, etc.); and the functionality the backup system is configured to use to obtain and stream the data that is to be backed up. In various embodiments, a maximum parallelism (number of backup write streams) is determined based on the capabilities and limitations of the source system as compared to the dynamically determined current capacity of the target system. For example, if given the data set and capabilities of the source system a maximum of 160 backup write streams could be sent but the target system capability is determined to be limited to 90 backup write streams, the backup may be configured dynamically to be performed in a manner that would require at most 90 backup write streams. Conversely, if the source system could be configured to send at most 40 backup write streams, then so long as the target system has at least that much capacity available (of its maximum capacity of 90 write streams), then the source side maximum of 40 backup write streams may be used.

In a further example, if at the time the backup is started the target system was determined dynamically to be able to support only an additional 30 backup write streams, then the backup may be configured initially to use those 30 backup write streams. If a later check of the target system, while the backup was underway, revealed that additional capacity had become available, then the number of backup write streams being used in the backup may be increased dynamically, while the backup is underway.

Figure 2:
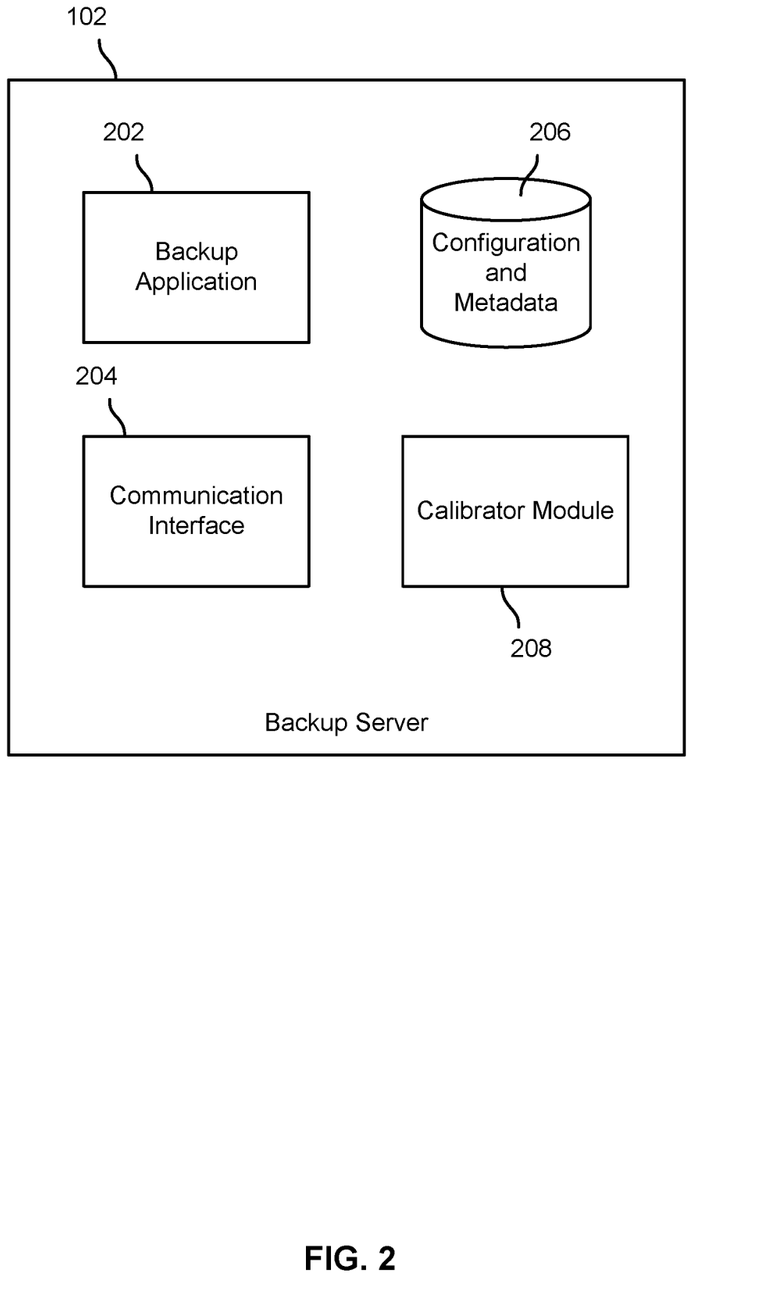
FIG. 2 is a block diagram illustrating an embodiment of a backup server.

FIG. 2 is a block diagram illustrating an embodiment of a backup server. In the example shown, an embodiment of backup server 110 of FIG. 1 is shown to include a backup application 202, e.g., EMC® NetWorker®, comprising software instructions that may be stored in memory or other data storage and executed by a processor (not shown) to coordinate and perform backup operations as disclosed herein. The backup application 202 may communicate via communication interface 204, e.g., a network interface card or other communication interface, with backup clients/agents running on remote computer systems on which data to be backed up is stored, e.g., file servers, application servers, database systems, etc. A backup configuration and metadata store 206 includes data that is used by backup application 202 to perform backups. For example, data that identifies backup client systems and their capabilities, defines data sets on such backup clients, sets the schedule and type of backups to be performed, and specifies the backup target system to which each data set is to be backed up, etc., may be stored in data store 206.

In the example shown, a calibrator module 208 is included in backup server 110. In some embodiments, calibrator module 208 may comprise a software module provided by using a processor comprising backup server 110 to execute software code to provide the calibrator module 208. In various embodiments, calibrator module 208 is configured to poll backup target system dynamically, e.g., at backup time and at a prescribed and/or configured interval while a backup is underway, to determine dynamically a current capacity of the target system. For example, the calibrator module 208 in various embodiments is configured to determine dynamically a number of (additional) backup write streams that a given backup target system can support. In some embodiments, the backup application 202 may query or otherwise invoke the calibrator module 208 to determine dynamically the number of (additional) backup write streams that a given backup target system can support. The backup application may be configured to set or adjust the number of write streams being used to perform a backup based at least in part on information provided by calibrator module 208.

While in the example shown in FIG. 2 the calibrator module 208 comprises a software module running on the backup server 102, in various embodiments the calibrator module 208 may comprises one or more of the following: a software module running on a physical system other than backup server 110; an appliance; a dedicated system.

Figure 3:
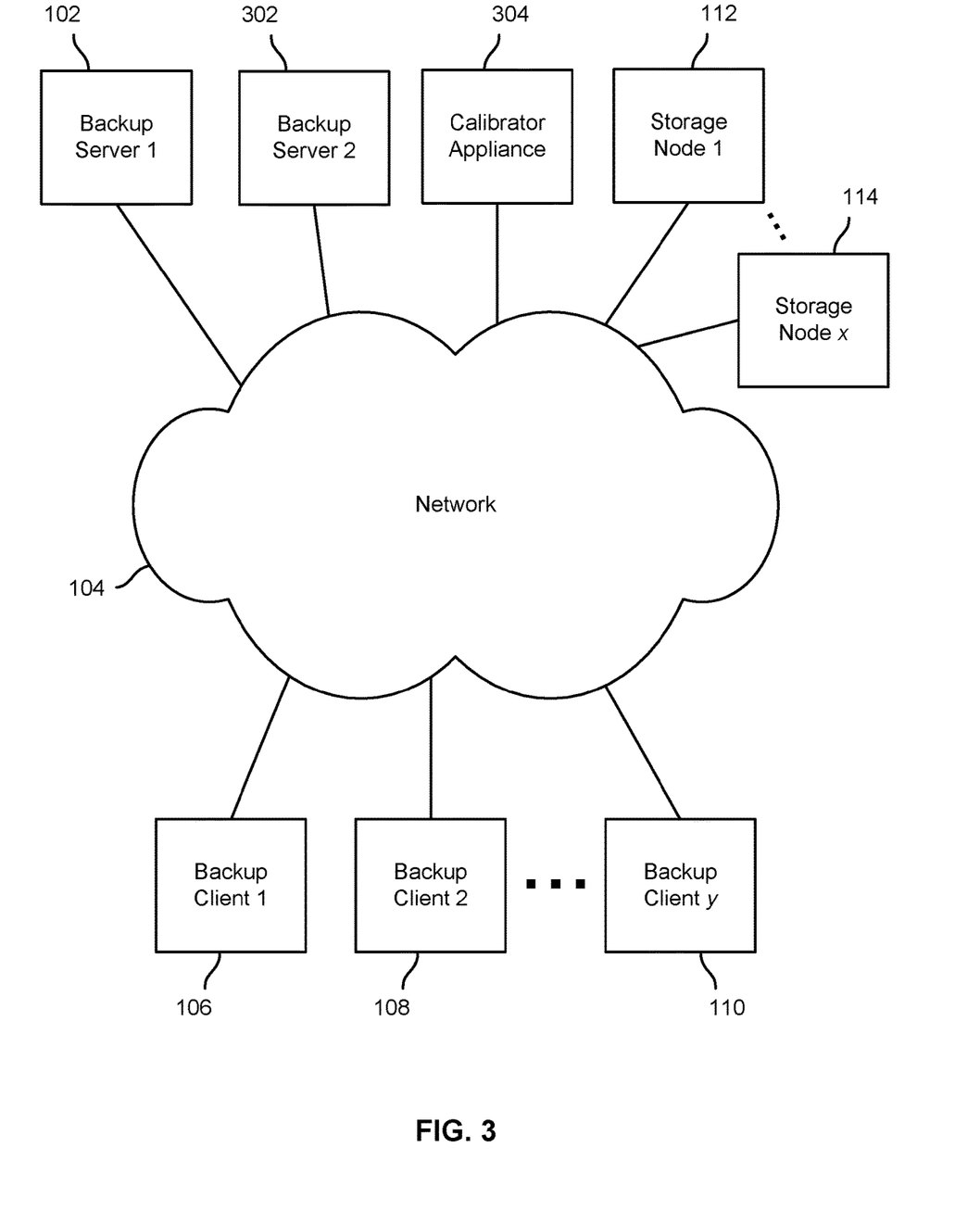
FIG. 3 is a block diagram illustrating an embodiment of a backup system and environment.

FIG. 3 is a block diagram illustrating an embodiment of a backup system and environment. In the example shown, a variation on the environment shown in FIG. 1 is shown to include a second backup server 302. In some embodiments, the second backup server 302 may be of a different type than backup server 102. For example, one may be an EMC® NetWorker® server and the other an EMC® Avamar® server. The respective backup servers 102, 302 may be configured to back up different subsets of the backup client systems represented in FIGS. 1 and 3 by backup clients 106, 108, and 110. In addition, the respective backup servers 102, 302 may be configured to store backup data on potentially overlapping sets or subsets of storage nodes 1 to x. For example, backup server 102 may be configured to back up data stored on backup client 106 to storage node 112, and backup server 302 may be configured to back up data stored on backup client 108 to the same storage node 102.

In the example shown, a separate calibrator appliance (or other system) 304 is accessible to both backup server 102 and backup server 302 via network 104. In various embodiments, the calibrator appliance 304 may be configured to use application programming interfaces (API) of storage nodes 1 to x, as applicable, to determine dynamically a current backup write stream (additional) available capacity of a target storage node to which a given backup data is to be sent.

In some embodiments, calibrator appliance 304 may be configured to allocate available capacity between data movers, e.g., backup servers 102, 302, that are configured to cause backup data to be streamed to the same target system. For example, if the backup server 102 queries the calibrator appliance to determine a backup write stream capacity of storage node 112, in some embodiments the calibrator appliance 304 may take into account a current or expected requirement of backup server 302 to send data to the same target system at the same time. In various embodiments, a configured and/or algorithmically determined allocation of available capacity may be made. For example, an even division of capacity among data movers, an allocation based on data set size, an allocation on a first-come-first-served basis, etc.

Figure 4:
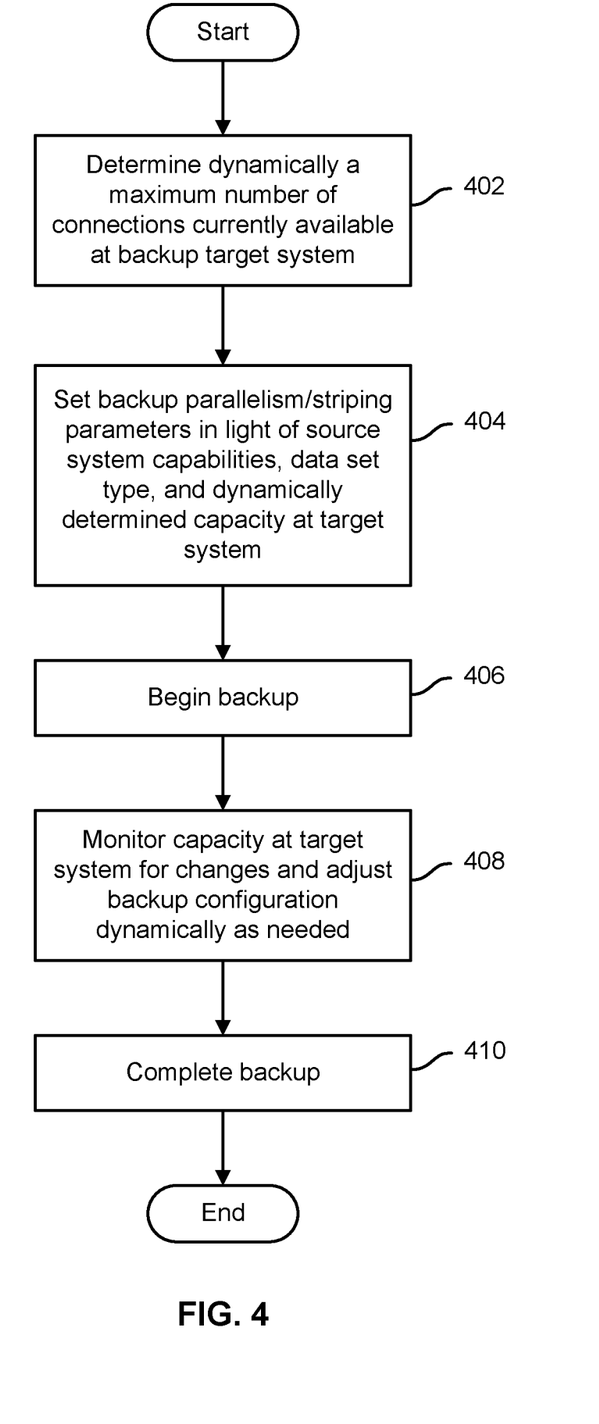
FIG. 4 is a flow chart illustrating an embodiment of a process to back up data using a dynamically determined degree of parallelism.

FIG. 4 is a flow chart illustrating an embodiment of a process to back up data using a dynamically determined degree of parallelism. In various embodiments, the process of FIG. 4 may be performed by a backup server, such as backup server 110 of FIGS. 1 and 3. In the example shown, when a time to back up a given system and/or data set thereon arrives, e.g., according to a user-defined backup schedule, a maximum number of connections (backup write streams) currently available at the backup target system (storage node) is determined dynamically (402). For example, a calibrator module, appliance, or system as disclosed herein may be used to query or poll the target system to determine its currently capacity to handle (additional) backup write threads. Backup parallelism, e.g., striping, parallel streams, etc., and/or other backup configurations and/or parameters are determined dynamically based at least in part on the dynamically determined (additional) capacity of the target system, and in various embodiments one or more other factors, such a data set type, source system capabilities, etc. (404). The backup is started using the dynamically determined number of backup write streams (406). The capacity at the target system is monitored as the backup progresses and, if necessary, adjustments are made dynamically to the number of backup write streams that are being used to perform the backup (408). For example, if more capacity is determined to have become available at the target system, the number of backup write streams being sent to the target system may be increased. Processing continues until the backup is completed (410), after which the process ends.

While in a number of examples described at length herein a capacity associated with a number of backup write streams that a target system can handle currently is determined dynamically, in various embodiments techniques disclosed herein may be used to determine a number of backup read streams that may be performed concurrently, e.g., in connection with one or more data recovery operations, a number of replication streams that are available to be used concurrently, and/or a mix of the various types of streams.

Figure 5:
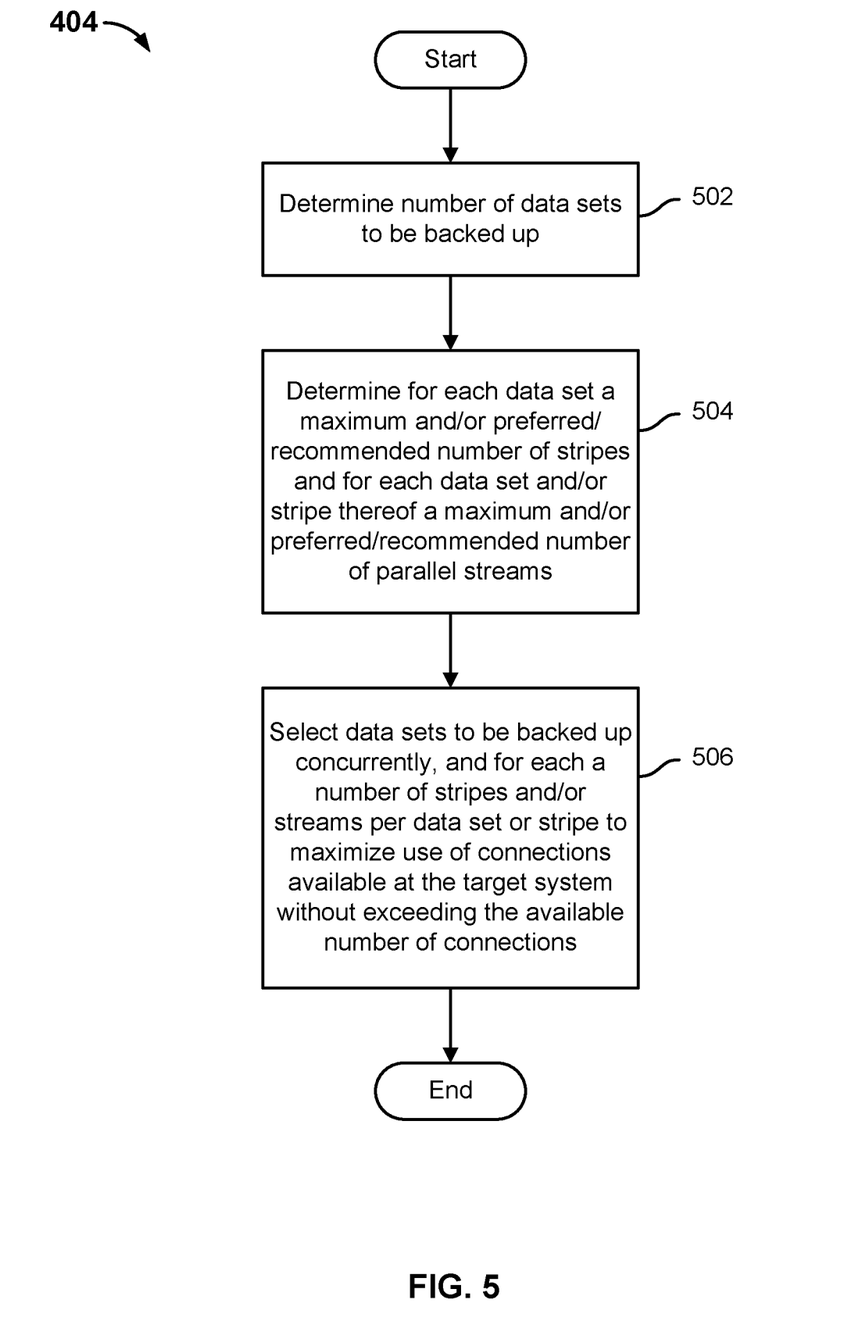
FIG. 5 is a flow chart illustrating an embodiment of a process to determine dynamically a degree of parallelism to be used during backup.

FIG. 5 is a flow chart illustrating an embodiment of a process to determine dynamically a degree of parallelism to be used during backup. In some embodiments, the process of FIG. 5 may be used to perform step 404 of the process of FIG. 4. In some embodiments, the process of FIG. 5 may be used to allocate capacity that has been determined dynamically to be available currently at a backup target system (e.g., storage node) across multiple backups, involving different data sets potentially across multiple source systems and/or multiple data movers. In the example shown, a number (and/or other attributes) of data sets to be backed up is determined (502). For each data set, a maximum and/or preferred, configured, and/or recommended number of stripes (or other divisions) to be used is determined, and for each data set and/or stripe (or other division) thereof, a maximum and/or preferred/recommended number of parallel streams is determined (504). For example, in the SQL example described above, a total of 10 databases may be determined to be present in the data set and a configuration parameter may indicate that up to 16 stripes per database may be used. Data sets to be backed up concurrently are selected, and for each a number of stripes (or other division) and/or streams per data set or division thereof is determined based at least in part on the dynamically determined number of (additional) write connections the target can support (i.e., number of backup write streams the target can receive) (506). In various embodiments, the number of data sets, striping, and streams per strip (or other division) is selected to maximize use of the available capacity at the target system without exceed the currently available capacity.

Figure 6:
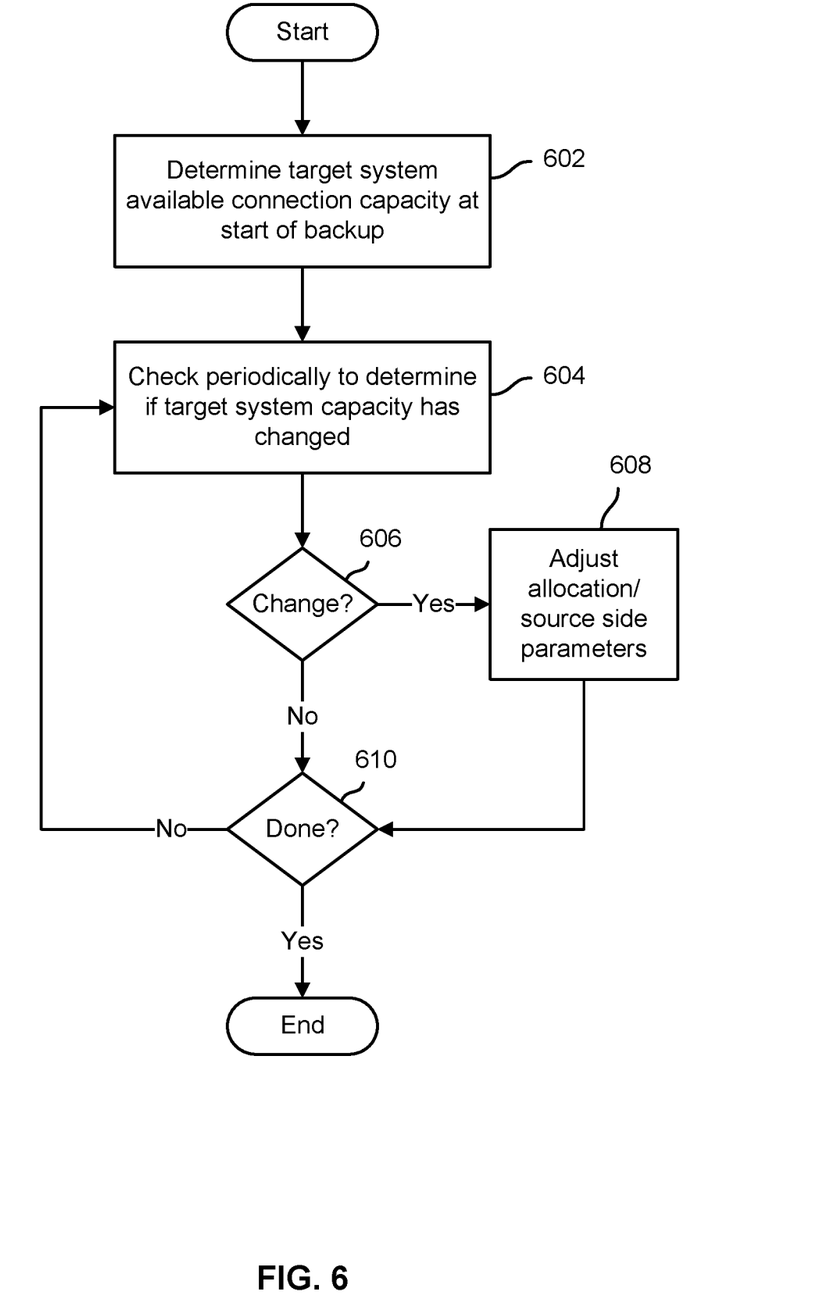
FIG. 6 is a flow chart illustrating an embodiment of a process to monitor and adjust for changes in backup target system write stream capacity during the course of a backup.

FIG. 6 is a flow chart illustrating an embodiment of a process to monitor and adjust for changes in backup target system write stream capacity during the course of a backup. In various embodiments, the process of FIG. 6 may be performed by a backup server, such as backup server 110 of FIGS. 1 and 3. In some embodiments, the process of FIG. 6 may be used to implement step 408 of FIG. 5. In the example shown, a capacity of the target system is determined dynamically at the start of a backup (602). A check (e.g., query, API call, polling) is performed periodically (e.g., at a configured and/or otherwise prescribed interval) to determine if the target system capacity has changed (604). If a change is detected (606), an allocation or other configuration of the backup as performed at the data source side, e.g., in terms of the number of write streams used, is adjusted as may be required to continue to maximize use of the available capacity without exceeding the available capacity (608). Monitoring of the target system capacity continues (604), without adjustments being made as/if the capacity is determined dynamically to have changed (606, 608) until the backup operation has been completed (610), at which time the process of FIG. 6 ends.

Techniques disclosed herein may be used to ensure that target system capacity is used as fully as possible, thereby shortening backup windows, without exceeding target system parallelism capacity, which could result in "hung" backups or other failures.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of protecting data, comprising:
   determining dynamically, at or near a time at which a backup operation is to be performed, a current capacity of a target system to which backup data is to be streamed to handle additional streams;
   comparing the determined current capacity of the target system to one or more capabilities of a source system, wherein the one or more capabilities of the source system include a maximum number of concurrent backup write streams;
   determining a number of concurrent backup streams for the backup operation based on the maximum number of concurrent backup write streams of the source system and a current number of additional backup write streams that the target system is capable of receiving;
   dynamically setting one or more backup parameters of the backup operation, based at least in part on the determined number of concurrent backup streams for the backup operation; and
   backing up to the target system the backup data based on the one or more backup parameters.

2. The method of claim 1, further comprising:
   receiving an indication to perform the backup operation; and
   initiating at least in part in response to the indication said step of determining dynamically the current capacity of the target system.

3. The method of claim 1, wherein the current capacity of the target system comprises the current number of additional backup write streams that the target system is capable of receiving.

4. The method of claim 1, wherein dynamically setting one or more backup parameters of the backup operation includes allocating among two or more data sets said current capacity of the target system.

5. The method of claim 1, wherein dynamically setting one or more backup parameters of the backup operation includes allocating among two or more data movers said current capacity of the target system.

6. The method of claim 1, wherein the current capacity of the target system is determined by a calibrator module, appliance, or system with which the backup operation is associated.

7. The method of claim 1, wherein the current capacity of the target system is determined at least in part by invoking an application programming interface (API) of the target system.

8. The method of claim 1, wherein the one or more backup parameters of the backup operation are set based at least in part on a capability of the source system on which a source data to be backed up in the backup operation is stored.

9. The method of claim 1, wherein the one or more backup parameters of the backup operation are set based at least in part on an attribute of a source data to be backed up in the backup operation is stored.

10. The method of claim 1, further comprising monitoring the target system while the backup operation is being performed to detect a change in said current capacity of the target system.

11. The method of claim 10, further comprising adjusting said one or more backup parameters during the course of the backup operation based at least in part on a determination that the current capacity of the target system has been detected to have changed.

12. A system to protect data, comprising:
   a communication interface; and
   a processor coupled to the communication interface and configured to:
     determine dynamically, at or near a time at which a backup operation is to be performed, a current capacity of a target system to which backup data is to be streamed to handle additional streams;
     compare the determined current capacity of the target system to one or more capabilities of a source system, wherein the one or more capabilities of the source system include a maximum number of concurrent backup write streams;
     determine a number of concurrent backup streams for the backup operation based on the maximum number of concurrent backup write streams of the source system and a current number of additional backup write streams that the target system is capable of receiving;
     dynamically set one or more backup parameters of the backup operation, based at least in part on the determined number of concurrent backup streams for the backup operation; and
     back up to the target system the backup data based on the one or more backup parameters.

13. The system of claim 12, wherein the processor is further configured to:
   receive an indication to perform the backup operation; and
   determine dynamically the current capacity of the target system at least in part in response to the indication.

14. The system of claim 12, wherein the current capacity of the target system comprises the current number of additional backup write streams that the target system is capable of receiving.

15. The system of claim 12, wherein to dynamically set one or more backup parameters of the backup operation, the processor is further configured to allocate among two or more data sets said current capacity of the target system.

16. The system of claim 12, wherein to dynamically set one or more backup parameters of the backup operation, the processor is further configured to allocate among two or more data movers said current capacity of the target system.

17. The system of claim 12, wherein the current capacity of the target system is determined at least in part by invoking an application programming interface (API) of the target system.

18. The system of claim 12, wherein the one or more backup parameters of the backup operation are set based at least in part on a capability of the source system on which a source data to be backed up in the backup operation is stored.

19. A computer program product to protect data, the computer program product being embodied in a non-transitory computer readable medium and comprising computer instructions for:
 determining dynamically, at or near a time at which a backup operation is to be performed, a current capacity of a target system to which backup data is to be streamed to handle additional streams;
 comparing the determined current capacity of the target system to one or more capabilities of a source system, wherein the one or more capabilities of the source system include a maximum number of concurrent backup write streams;
 determining a number of concurrent backup streams for the backup operation based on the maximum number of concurrent backup write streams of the source system and a current number of additional backup write streams that the target system is capable of receiving;
 dynamically setting one or more backup parameters of the backup operation, based at least in part on the determined number of concurrent backup streams for the backup operation; and
 backing up to the target system the backup data based on the one or more backup parameters.

20. The computer program product of claim 19, wherein the current capacity of the target system comprises the current number of additional backup write streams that the target system is capable of receiving.

* * * * *